United States Patent Office 2,798,099
Patented July 2, 1957

2,798,099
DI-(ALKYLARYL)-DESOXY-HEXITOLS

Carl B. Linn, Riverside, Ill., assignor to Universal Oil Products Company, Des Plaines, Ill., a corporation of Delaware No Drawing. Application July 16, 1954,
Serial No. 443,958

3 Claims. (Cl. 260—618)

This invention relates to a new class of organic chemical compounds, the di-(alkylaryl)-desoxy-hexitols in which each alkyl group contains from about 9 to about 24 carbon atoms. The present application is a continuation-in-part of application Serial No. 360,838, filed June 10, 1953, which is in turn a continuation-in-part of application Serial No. 212,839, filed February 26, 1951, now abandoned.

More particularly the invention relates to didodecylphenyl-desoxy-hexitols and didodecylphenyl-desoxy-D-glucitols and to a process for their preparation.

Still more particularly, the invention relates to 1,1-di-(dodecylphenyl)-1-desoxy-D-glucitol, its preparation and its use as a lubricating oil additive to improve the viscosity index of said lubricating oil.

Besides being useful as additives for lubricating oils, the di-(alkylaryl)-desoxy-hexitols are also useful as intermediates in organic synthesis such as in the production of detergents, wetting agents and the like.

An object of this invention is to provide novel condensation products of carbohydrates and long chain alkyl aromatic hydrocarbons, for example, the didodecylaryl-desoxy-hexitols, which are adapted for use as lubricating oil additives and also as intermediates in the production of detergents and wetting agents.

One embodiment of this invention is a composition of matter comprising essentially a commingled mixture of an oil and a di-(alkylaryl)-desoxy-hexitol in which each of said alkyl groups contain from about 9 to about 24 carbon atoms.

Another embodiment of this invention is a composition of matter comprising essentially a lubricating oil and a di-(alkylaryl)-desoxy-hexitol in which each of said alkyl groups contains from about 9 to about 24 carbon atoms.

An additional embodiment of this invention is a composition of matter comprising essentially a lubricating oil and a 1,1-di-(alkylphenyl)-desoxy-D-glucitol in which each of said alkyl groups contains from about 9 to about 24 carbon atoms.

A further embodiment of this invention is a composition of matter comprising essentially a lubricating oil and a 1,1-di-(dodecylphenyl)-desoxy-D-glucitol.

A still further embodiment of this invention is a composition of matter comprising essentially 1,1-di(dodecylphenyl)-1-desoxy-D-glucitol.

I have found that di-(alkylaryl)-desoxy-hexitols and particularly 1,1-di-(dodecylphenyl)-1-desoxy-D-glucitol, are useful for adding to lubricating oils to improve the viscosity index thereof. That is, these additives act as thickening agents for oil, particularly lubricating oils and decrease the thinning out of said oil mixtures or solutions at higher temperatures such as the normal operating temperature of the lubricating oil in an internal combustion engine.

These di-(alkylaryl)-desoxy-hexitols are produced by reacting an alkylaromatic hydrocarbon, for example a nonyl-dodecyl-, pentadecyl-benzene or higher-alkylbenzene with a carbohydrate such as glucose, sucrose, cellulose, etc. in the presence of strong hydrofluoric acid, generally from about 85 to about 100% hydrogen fluoride at a temperature of from about $-20°$ to about $+100°$ C. for a time sufficient to effect condensation, sometimes being from about 5 to about 70 hours.

Although strong hydrofluoric acid is generally the catalyst preferred for use in producing my di-(alkylphenyl)-desoxy-glucitols with long alkyl groups, certain modified Friedel-Crafts type catalysts are also useful for this purpose. Highly active Friedel-Crafts catalysts, as substantially anhydrous aluminum chloride, sometimes have a cracking action on the long chain alkyl groups of the alkylaromatic hydrocarbon starting material and accordingly are less desirable than a modified Friedel-Crafts halide, as aluminum chloride modified by addition thereto of an alcohol, an ether, an ester, a nitroparaffin, and the like to produce a modified catalyst with a controlled activity generally used at 30° to 100° C. and preferably at 50° to 80° C.

The alkylaromatic hydrocarbons which are reacted with carbohydrates as hereinabove set forth may be formed by alkylating benzene, toluene, and other mononuclear and polynuclear aromatic hydrocarbons with olefinic hydrocarbons containing from about 9 to about 24 carbon atoms. Suitable olefins for this alkylation treatment as in the presence of hydrofluoric acid, sulfuric acid, etc. comprise polymers of propylene, butylene, etc. and particularly the polymers of propylene such as the trimer, tetramer, pentamer, hexamer and higher molecular weight polymers of said propylene.

Carbohydrates which are condensed with long chain alkylaromatic hydrocarbons to form the compositions of this invention include simple sugars, their desoxy derivatives, compound sugars, or oligosaccharides and polysaccharides. Simple sugars include dioses, trioses, tetroses, pentoses, hexoses, heptoses, octoses, nonoses and decoses. Compound sugars include disaccharides, trisaccharides, and tetrasaccharides. Suitable polysaccharides are those composed of only one type of sugar residue, polysaccharides composed of more than one type of sugar unit, polysaccharides composed of one type of uronic acid unit, polysaccharides comprised of aldose (pentose or hexose) and uronic acid units, polysaccharides containing hexose units esterified with an inorganic acid, and polysaccharides containing amino sugar units.

Utilizable simple sugars include the diose, glycolaldehyde; trioses, such as glyceraldehyde and s-dihydroxyacetone; tetroses, such as erythrose, threose, erythrulose, and apiose; the pentoses such as arabinose, xylose, ribose, lyxose, rhamnose (a desoxy-hexose), frucose (a desoxyhexose), rhodeose, digitalose, and ketoxylose; the hexoses, such as mannose, glucose, idose, gulose, gallactose, talose, allose, altrose, fructose, sorbose, tagatose, and psicose; heptoses such a glucoheptose, mannoheptose, galactohextose, sedoheptose, mannoketoheptose, glucoheptulose, and perseulose; octoses such as glucooctose, mannooctose, and gallactooctose; nonoses such as glucononose, and mannononose; and decoses such as glucodecose. Desoxy derivatives of simple sugars are formed by the replacement of a hydroxyl substituent in a sugar with hydrogen thereby forming a methyl or methylene linkage. The desoxy-pentoses and desoxy-hexoses are the most commonly occurring of such compounds. The utilizable oligosaccharides or compound sugars include disaccharides such as the pentose-hexose saccharides including glucoapiose, vicianose, and primeverose; the methylpentose-hexose saccharides including glycorhamnoside, and rutinose and the dihexoses such as turanose, maltose, lactose, cellobiose, gentiobiose, melibiose, sucrose, and trehalose. Other compound sugars are represented by trisaccharides such as the methyl-pentose-hexose saccharides including rhamninose, and robinose; the trihexose saccharides such as mannotriose; and the trihexoses including raffinose, melezitose, and gentianose. An example of a suitable tetrasaccharides is stachyose.

Various polysaccharides are also utilizable in the process of the present invention. These polysaccharides include pentosans such as araban, methylpentosans such as fugosan, the hexosans, such as starch, cellulose, glycogen, inulin, mannan, galactan, lichenin, levan, dextran, and laminarin. All of the above polysaccharides are composed of one type of sugar residue. Other polysaccharides which are composed of more than one type of suguar unit such as the pentosans, like araboxylan and the hexosans like galactomannan may be used. Other utilizable polysaccharides are represented by those composed of uronic acid units such as pectic acid and alginic acid; those composed of aldose (pentose or hexose) and uronic acid units such as gum arabic, damson gum, gum tragacanth, linseed mucilage, pectins, and those containing hexose units esterified with an inorganic acid such as certain seaweed polysaccharides like agar.

The hydrogen fluoride catalyst which is used in producing the compositions of this invention is preferably used in anhydrous form or diluted with water to make a hydrofluoric acid of the desired concentration. The hydrofluoric acid may also be diluted further with various inert diluents when it is desired to operate the process with low hydrogen fluoride concentration. Suitable inert diluents include normal paraffinic hydrocarbons such as propane, normal butane, normal pentane, normal hexane, etc. and perfluoro derivatives of normal paraffinic hydrocarbons such as perfluoro propane, perfluoro normal butane, perfluoro normal pentane, and perfluoro normal hexane. Other suitable diluents in these classes are apparent to one skilled in the art. For example, cycloparaffins as cyclopentane and cyclohexane may be used. In some instances, hydrofluoric acid of from about 85 to about 100% HF concentration is desirable, and in some instances it is more desirable to use substantially anhydrous hydrogen fluoride as the catalyst.

The condensation reaction may be carried out by slowly adding hydrogen fluoride catalyst to a stirred mixture of the hydrocarbon and carbohydrate or reversely by adding the mixture of hydrocarbon and carbohydrate with stirring to a hydrogen fluoride catalyst while maintaining the reaction temperature at from about −20° to about 100° C. by using suitable cooling and/or heating means. It is often advisable or desirable to commingle the reactants and catalyst at a relatively low temperature such as from about −80° to about −30° C. and then to permit the reaction mixture to warm gradually while the reactants and catalyst are stirred by suitable means such as a motor driven stirrer or other adequate mixing equipment. After the reaction has reached the desired degree of completion, the hydrogen fluoride is removed from the reaction mixture by distillation at atmospheric pressure or lower pressure or by passing an inert gas through the reaction mixture while maintaining it at a relatively low temperature. Also the entire reaction mixture and catalyst may be mixed with water or may be added to ice in order to quench the activity of the hydrogen fluoride catalyst and to permit separation of the organic reaction products and unreacted starting materials from the catalyst. The organic reaction products may also be separated from aqueous hydrogen fluoride by means of an organic solvent such as an ether or other organic compound in which some of the organic material may be dissolved.

The production of my di-(alkylaryl)-desoxy-hexitols may also be carried out continuously by charging the alkylaromatic hydrocarbon, carbohydrate and catalyst continuously to a baffled reactor or other suitable mixing equipment, from which the reaction product is discharged continuously to suitable separating equipment. Thus, for example, when employing substantially anhydrous hydrogen fluoride as catalyst, the hydrogen fluoride, alkylaromatic hydrocarbon and sugar are charged to a tubular reactor surrounded by a cooling and/or heating means in which mixing of the reactants and catalyst occurs. The reactor may discharge into a flash chamber, from which the hydrogen fluoride catalyst is separated from reaction products and unconverted starting materials. The recovered hydrogen fluoride catalyst is then recycled to further use in the process. The reaction products are also separated by suitable means from unconverted starting materials, and the latter may then be subjected to further conversion in the process.

Further methods of isolating the reaction product are illustrated in the example.

EXAMPLE I

This example describes a study of the reaction of cellulose, a polysaccharide, with dodecylbenzene in the presence of hydrogen fluoride. The dodecylbenzene was an alkylate boiling at 290° C. produced from propylene tetramer and benzene. The reaction of dodecylbenzene with cellulose was carried out mainly at 0° C. using contact times of from about 3 to about 70 hours; one reaction was studied at about 30° C.

In these runs the dodecylbenzene and cellulose were sealed into a 1 liter turbomixer. After cooling to about −40° C., hydrogen fluoride was put into the system under pressure from a weighed bomb and the contactor was stirred for the required time at ice bath temperature (and in one case at 30° C.). A stream of nitrogen was then passed through the reactor for 1 to 3 hours; this removed most of the hydrogen fluoride. The autoclave was then opened and the contents transferred to a silver dish which was subsequently placed in a hood draft for 18-24 hours. The hydrogen fluoride still remaining in the product was only about 20 grams at this point. Then the product was washed thoroughly with pentane to remove any pentane-soluble component, after which it was separated into cold water-soluble and cold water-insoluble fractions. Each of these portions was then worked up separately to separate pure compounds therefrom.

The following table lists the experiments carried out, the conditions employed, and the reaction products obtained:

*Table I.—Reaction of cellulose with dodecylbenzene in the presence of hydrogen fluoride*

| Run No | 28 | 29 | 30 | 31 | 32 | 33 |
| --- | --- | --- | --- | --- | --- | --- |
| Charge, Gms.: | | | | | | |
| Cellulose | 30 | 30 | 41 | 61 | 61 | 60 |
| Dodecylbenzene | 100 | 100 | 172 | b 176 | 258 | 260 |
| Hydrogen Fluoride | 228 | 227 | 232 | 236 | 238 | 239 |
| Conditions: | | | | | | |
| Temp., °C | 0 | 0 | 0 | 0 | 0 | 34 |
| Contact Time, Hrs | 3 | 5.5 | 21 | 44 | 70 | 16 |
| Recovery, Gms.: | | | | | | |
| Water-Soluble | | | 25 | 39 | 54 | a |
| Water-Insoluble | | | 160 | 160 | 260 | |
| Dodecylbenzene | >83 | 91 | 140 | 149 | 234 | 152 |
| B.P.>Dodecylbenzene | trace | 5 | 20 | 10 | 26 | 122 | a Water-soluble material low and not determined. This run in addition to the noted products, give 30 grams of a sludge, insoluble in both benzene and water.
b Recycled dodecylbenzene utilized in previous runs.

The dodecylbenzene used in the above experiments was a fraction boiling at 290° C. from the major plateau in the $C_{18}$ range of a product from the alkylation of benzene with propylene tetramer. This material was completely resistant to oxidation by chromic acid or alkaline potassium permanganate solutions, indicating that the alpha carbon atom attached to the aromatic nucleus had three other substituent groups. All of the work was carried out at a reaction temperature of 0° C. except one run at 34° C. It was noted that when the first experiment (run 28) was completed, that dodecylbenzene is far less reactive than toluene since very little reaction was observed during three hours of contacting at 0° C. When the contacting time was extended to 5.5 hours (run 29), 5 grams of a higher boiling reaction product was isolated. This product was not identified further.

In the next experiment, run 30, the contacting was continued for 21 hours. From this reaction, 160 grams of an ether-soluble–water-insoluble segment was obtained, along with 40 grams of a water-soluble–ether-insoluble material. The 160 gram fraction was separated by ordinary distillation followed by steam distillation and 140 grams of dodecylbenzene was recovered along with 20 grams of a higher boiling product. This 20 grams was dissolved in pentane and upon evaporation yielded a brown material of a buttery consistency, resembling a fiber grease. This material was surface-active and gave a soapy feeling in water. Elementary analysis for carbon and hydrogen are as follows: carbon; 80.12% found, and 77.01% calculated for $C_{42}H_{70}O_5$: hydrogen; 10.73% found, and 10.77% calculated for $C_{42}H_{70}O_5$. This elementary analysis is in fairly good agreement with that demanded by the structure:

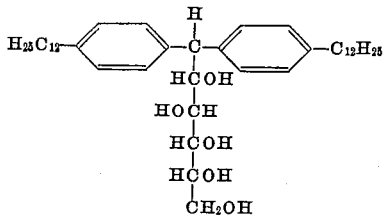

This product was tested as an additive for a lube oil for enhancing its viscosity index. The viscosity index for the base stock (a Pennsylvania lube oil) was 102.7; with 5.1% of the product dissolved therein, its viscosity index was raised to 113.1.

While reaction times of at least five hours at 0° C. were necessary to get appreciable reaction of dodecylbenzene with cellulose, there was, on the other hand, little improvement in yields at reaction times above 20 hours. This would indicate that the dodecylbenzene used became depleted of a reactive isomer, leaving a refractory material. This conclusion is borne out by the data of run 31, Table I. In run 31, the dodecylbenzene charged was recycle material from previous runs and it will be observed that the product (boiling point greater than dodecylbenzene) was only 50% of run 30. The reactive isomer had apparently been substantially exhausted in previous runs.

From run 32, Table I, 26 grams of a brown paste similar to that previously described, was obtained. The surface-active properties of this paste were evaluated by dissolving 2.61 grams per liter in benzene. The interfacial tension (benzene/$H_2O$) was 6.3 dynes/cm., in comparison to 27.3 dynes/cm. for pure benzene. The surface tension (air-liquid) of this solution was 26.2 dynes/cm. in comparison to 28.2 dynes/cm. for pure benzene. Further tests with this product also indicated that it was effective for increasing the viscosity index of various lube oils.

The effect of temperature upon the reaction is shown in run 33, carried out at 34° C. Here the conversion of dodecylbenzene was severalfold greater than from similar runs at 0° C. This indicates that even the more refractory isomers of the dodecylbenzene react at elevated temperature. The product was similar in physical appearance and composition to that product formed at 0° C. A portion of the product was hydrogenated catalytically with 5 grams of a nickel-kieselguhr catalyst at 100° C. under 100 atmospheres of hydrogen pressure. The results demonstrated that 320 ml. of hydrogen per gram were absorbed.

One gram of the water-insoluble–ether-soluble product boiling above dodecylbenzene from run 32 was added to 40 ml. of concentrated nitric acid at 0° C. 40 ml. of concentrated sulfuric acid was then added dropwise at 0° C., the sample dissolved slowly. After standing 20 hours at 25° C., ice was added to precipitate out a yellow product. This was water washed, dried, and on analysis for nitrogen was found to contain 5.28% nitrogen.

I claim as my invention:

1. A di-(alkylaryl)-desoxy-hexitol in which each of said alkyl groups contains from about 9 to about 24 carbon atoms and in which each of the alkylaryl groups consists of carbon and hydrogen.

2. A di-(alkylphenyl)-desoxy-D-glucitol in which each of said alkyl group contains from about 9 to about 24 carbon atoms.

3. A di-(dodecylphenyl)-desoxy-D-glucitol.

References Cited in the file of this patent
UNITED STATES PATENTS

| | | |
|---|---|---|
| 2,460,803 | Bonner et al. | Feb. 8, 1949 |
| 2,472,276 | Bonner et al. | June 7, 1949 |
| 2,529,300 | Lieber | Nov. 7, 1950 |
| 2,570,402 | Stevens | Oct. 9, 1951 |
| 2,645,667 | Burgoyne | July 14, 1953 |